(12) United States Patent
Kuesel et al.

(10) Patent No.: US 11,068,318 B2
(45) Date of Patent: Jul. 20, 2021

(54) DYNAMIC THREAD STATUS RETRIEVAL USING INTER-THREAD COMMUNICATION

(71) Applicant: INTERNATIONAL BUSINESS MACHINES CORPORATION, Armonk, NY (US)

(72) Inventors: Jamie R. Kuesel, Rochester, MN (US); Mark G. Kupferschmidt, Bothen, WA (US); Paul E. Schardt, Rochester, MN (US); Robert A. Shearer, Woodinville, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/673,999

(22) Filed: Nov. 5, 2019

(65) Prior Publication Data

US 2020/0073725 A1    Mar. 5, 2020

Related U.S. Application Data

(63) Continuation of application No. 15/018,223, filed on Feb. 8, 2016, now Pat. No. 10,534,654, which is a
(Continued)

(51) Int. Cl.
*G06F 9/30* (2018.01)
*G06F 9/50* (2006.01)
(Continued)

(52) U.S. Cl.
CPC .......... *G06F 9/5083* (2013.01); *G06F 9/3009* (2013.01); *G06F 11/30* (2013.01);
(Continued)

(58) Field of Classification Search
CPC .................................................... G06F 9/5083
See application file for complete search history.

(56) References Cited

U.S. PATENT DOCUMENTS

| 6,122,671 A | 9/2000 | Farrar, Jr. et al. |
| 6,904,597 B2 | 6/2005 | Jin |

(Continued)

OTHER PUBLICATIONS

Kuesel, Jamie R. et al. "Dynamic Thread Status Retrieval Using Inter-Thread Communication" U.S. Appl. No. 16/673,998, filed Nov. 5, 2019.
(Continued)

*Primary Examiner* — Michael Sun
(74) *Attorney, Agent, or Firm* — Cantor Colburn LLP; Steven Meyers

(57) ABSTRACT

A method for dynamically providing a status of a hardware thread/hardware resource independent of the operation of the hardware thread/hardware resource using an inter-thread communication protocol. A master hardware thread may be configured to communicate status requests to associated slave hardware threads and/or hardware resources. Each slave hardware thread/hardware resource may be configured with hardware logic configured to automatically determine status information for the slave hardware thread/hardware resource and communicate a status response to the master hardware thread without interrupting processing of the slave hardware thread/hardware resource.

11 Claims, 8 Drawing Sheets

Related U.S. Application Data continuation of application No. 13/793,458, filed on Mar. 11, 2013, now Pat. No. 9,256,574, which is a continuation of application No. 13/767,133, filed on Feb. 14, 2013, now Pat. No. 9,256,573.

(51) Int. Cl.
| | | |
|---|---|---|
| G06F 15/76 | (2006.01) | |
| G06F 11/30 | (2006.01) | |
| G06F 15/78 | (2006.01) | |
| G06F 13/362 | (2006.01) | |
| G06F 13/40 | (2006.01) | |
| G06F 11/34 | (2006.01) | |

(52) U.S. Cl.
CPC ...... *G06F 11/3031* (2013.01); *G06F 11/3055* (2013.01); *G06F 11/3096* (2013.01); *G06F 13/362* (2013.01); *G06F 13/4068* (2013.01); *G06F 15/76* (2013.01); *G06F 15/7825* (2013.01); *G06F 11/3072* (2013.01); *G06F 11/348* (2013.01); *G06F 11/3433* (2013.01)

(56) References Cited

U.S. PATENT DOCUMENTS

| | | | |
|---|---|---|---|
| 7,765,547 | B2 | 7/2010 | Cismas et al. |
| 7,996,614 | B2 | 8/2011 | Dinkjian et al. |
| 9,256,573 | B2 | 2/2016 | Kuesel et al. |
| 9,256,574 | B2 | 2/2016 | Kuesel et al. |
| 9,806,895 | B1* | 10/2017 | Kommula ............. H04L 49/201 |
| 2005/0235136 | A1* | 10/2005 | Barsotti ............. G06F 11/3017 |
| | | | 713/1 |
| 2006/0069780 | A1* | 3/2006 | Batni ..................... H04L 41/00 |
| | | | 709/226 |
| 2008/0028154 | A1 | 1/2008 | Hoover et al. |
| 2008/0263339 | A1 | 10/2008 | Kriegel et al. |
| 2009/0013210 | A1* | 1/2009 | McIntosh ............ H04L 41/0672 |
| | | | 714/4.1 |
| 2009/0282214 | A1* | 11/2009 | Kuesel .................. G06F 9/3851 |
| | | | 712/29 |
| 2010/0153965 | A1 | 6/2010 | Arimilli et al. |
| 2010/0191911 | A1 | 7/2010 | Heddes et al. |
| 2010/0318693 | A1 | 12/2010 | Espig et al. |
| 2010/0333099 | A1* | 12/2010 | Kupferschmidt ....... G06F 9/546 |
| | | | 718/103 |
| 2011/0302395 | A1* | 12/2011 | Hall ........................ G06F 9/327 |
| | | | 712/226 |
| 2012/0185484 | A1 | 7/2012 | Jones et al. |
| 2013/0159674 | A1 | 6/2013 | Muff et al. |
| 2014/0229706 | A1 | 8/2014 | Kuesel et al. |
| 2014/0229709 | A1 | 8/2014 | Kuesel et al. |
| 2015/0120977 | A1* | 4/2015 | Hunsaker ............ G06F 11/1004 |
| | | | 710/110 |
| 2016/0154683 | A1 | 6/2016 | Kuesel et al. |
| 2016/0154752 | A1 | 6/2016 | Kuesel et al. |

OTHER PUBLICATIONS

Leary, Glenn, et al. "Performance and resource optimization of NoC router architecture for master and slave IP cores" In Proceedings of the 5th IEEE/ACM Int'l Conference on Haredware/software codesign and system synthesis (CODES+ISSS '07); 2007; ACM, DOI= 10.1145/1289816.1289856; pp. 155-016.

\* cited by examiner

DYNAMIC THREAD STATUS RETRIEVAL USING INTER-THREAD COMMUNICATION

DOMESTIC PRIORITY

This application is a continuation application of the legally related U.S. Ser. No. 15/018,223 filed Feb. 8, 2016, which is a Continuation Application of U.S. application Ser. No. 13/793,458 and issued as U.S. Pat. No. 9,256,574, on Feb. 9, 2016; which is a Continuation Application of U.S. application Ser. No. 13/767,133 and issued as U.S. Pat. No. 9,256,573, issued on Feb. 9, 2016, the contents of which are incorporated by reference herein in their entirety.

BACKGROUND

The invention is generally related to data processing in a computing system including a plurality of interconnected processing blocks, and in particular to processor architectures and communication architectures incorporated therein.

A network on a chip (NOC) is a novel integrated circuit architecture that applies a network-based architecture to a single chip to create a unique processing unit. A typical NOC includes a plurality of integrated processor (IP) blocks coupled to one another via the network. NOC processing units typically distribute (i.e., allocate) various parts of a job to different hardware threads of one or more IP blocks to be executed by the one or more IP blocks in the NOC processing unit. With the number of IP blocks in standard computer systems expected to rise, distributing tasks of a workload to hardware threads of the IP blocks has become increasingly demanding. In general, when distributing a workload, the status of hardware threads of IP blocks may be useful when determining whether to allocate a task to a particular IP block. Retrieving and accumulating thread status information, however, may be a processing resource expensive task in systems configured with large numbers of hardware threads.

A continuing need exists in the art for a manner of increasing the efficiency of workload distribution in computing systems including a plurality of interconnected integrated processor blocks.

SUMMARY

The invention addresses these and other problems associated with the prior art by utilizing a direct inter-thread communication (DITC) interface to communicate status requests from a master hardware thread to one or more slave hardware threads of a computing system. Each slave thread may be associated with status logic that determines the status of the slave thread and communicates a status response for the slave thread to the master thread. The master thread may be configured with thread status logic that analyzes status responses received from slave threads and causes the master hardware thread to perform one or more actions based on the received status responses. Consistent with embodiments of the invention, the status logic of each slave thread may be configured to automatically respond to a received status request without interrupting processing of the slave thread, i.e., without software thread involvement at the slave thread. Hence, embodiments of the invention dynamically retrieve/collect status related data for one or more slave threads with a master thread without interrupting the processing of software threads at the slave threads using configured hardware logic and messages communicated over the DITC interface.

Consistent with embodiments of the invention, a status request may be received at an inbox of a slave hardware thread from a master hardware thread. Status logic associated with the slave hardware thread may determine a status associated with the first hardware thread in response to receiving the status request in the inbox. Moreover, consistent with embodiments of the invention, the status logic is configured to determine the status of the slave hardware thread automatically and communicate the determined status independent of software direction/processing at the slave hardware thread, i.e., without interrupting processing of the slave hardware thread. Put another way, the status logic associated with the slave hardware thread determines the status of the slave hardware thread independent of the operations of the slave hardware thread. Hence, without the slave hardware thread processing the status request and/or without a software thread causing the slave hardware thread to perform an operation to thereby determine the status of the slave hardware thread, the status of the slave hardware thread is determined and communicated.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

Figure 1:
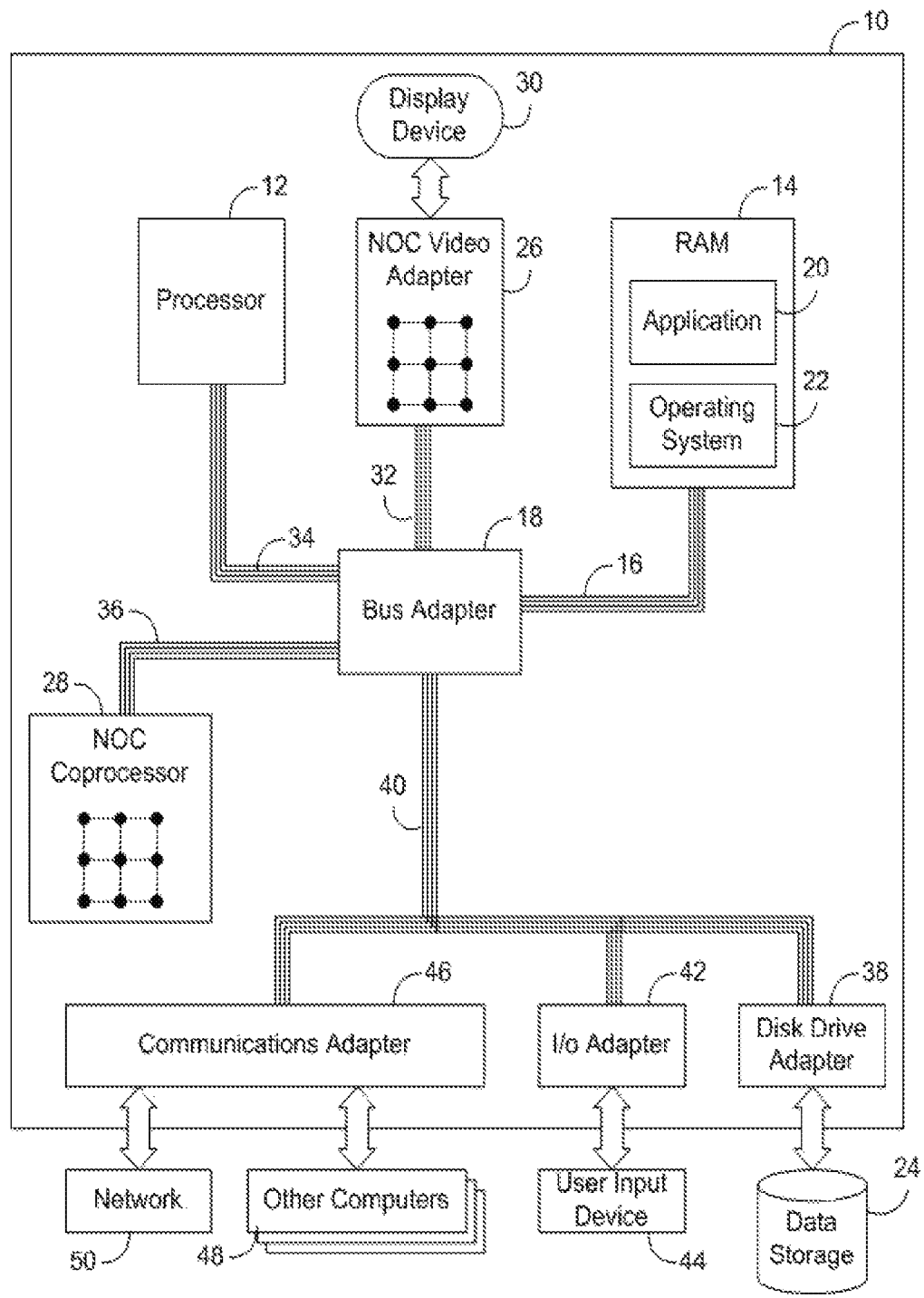
FIG. 1 is a block diagram of exemplary automated computing machinery including an exemplary computer useful in data processing consistent with embodiments of the present invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments of the invention provide a circuit arrangement and method for dynamically collecting status data for a plurality of hardware threads disposed in a plurality of integrated processing (IP) blocks coupled to one another in a network on a chip (NOC) arrangement. Consistent with embodiments of the invention, a direct inter-thread communication (DITC) communication bus is utilized to communicate a status request from a master hardware thread to an inbox associated with the slave hardware thread. The slave hardware thread includes status logic configured to automatically communicate a status response over the DITC communication bus to the master thread responsive to receiving the status request. The status logic of a slave hardware thread is configured such that the status of the thread may be determined and communicated by the status logic without processing the status request with the slave hardware thread.

In embodiments of the invention, a slave hardware thread does not interrupt processing of a software thread to analyze the status request message, determine the status, and communicate a status response to the master thread. Instead, the status logic automatically determines the status and communicates the status response responsive to receiving the status request at the inbox associated with the slave hardware thread. Therefore, embodiments of the invention may realize performance efficiency benefits because the slave hardware thread is not tasked with processing the status response, but instead may continue processing allocated tasks. Moreover, in some embodiments of the invention, status logic may be associated with hardware resources that the system may not otherwise be able to determine the status of. Such hardware resources may include, for example, hardware accelerators and/or coprocessors, regular expression engines, compression/decompression engines, encryption/decryption engines, XML parsers, etc. The hardware resources may be configured with status logic, a memory (e.g., a special purpose register) configured to store status information and an inbox/outbox DITC interface connected to the DITC communication bus such that the status of such hardware may be dynamically collected by a master thread consistent with embodiments of the invention.

In some embodiments, shared inboxes may be associated with subsets of the plurality of hardware threads of the NOC system, where the subsets may be referred to as "pools" of hardware threads. Inter-thread communications may utilize data packets (i.e., "messages") communicated to and from the shared inboxes, such that data packets may not be addressed directly to specific hardware threads but to a pool of hardware threads associated with a particular shared inbox. The shared inboxes may receive work requests from any of the hardware threads of the pool associated therewith and communicate data packets to the requesting hardware threads. In some embodiments, a respective shared inbox may be associated with a pool of hardware threads executing the same and/or related software threads, including for example, a pool of hardware threads executing instances of a stage of a software pipeline. As such, a shared inbox may manage workload balancing between hardware threads of an associated pool of hardware threads by communicating data packets to such hardware threads for processing upon request of such hardware threads.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
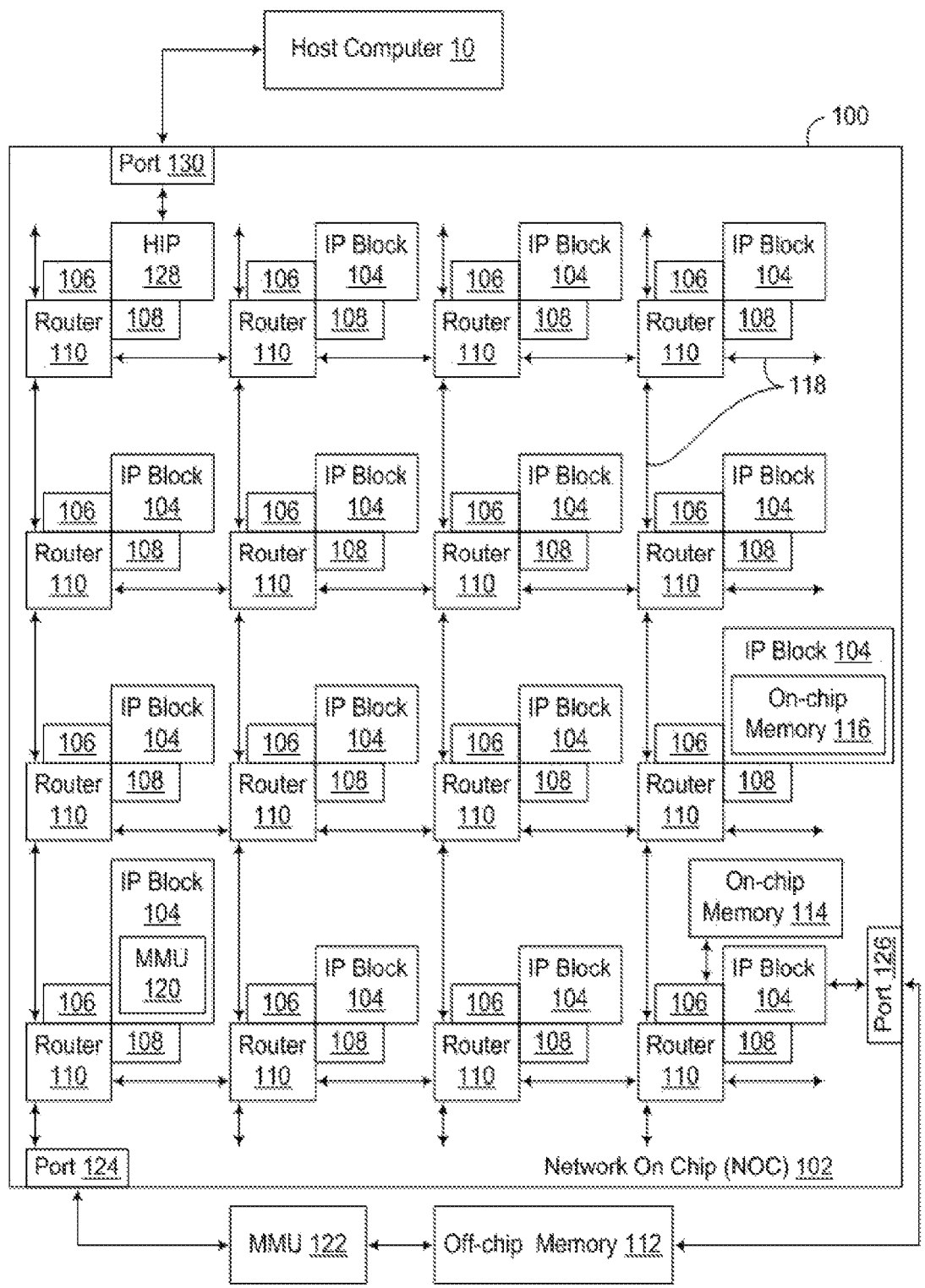
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
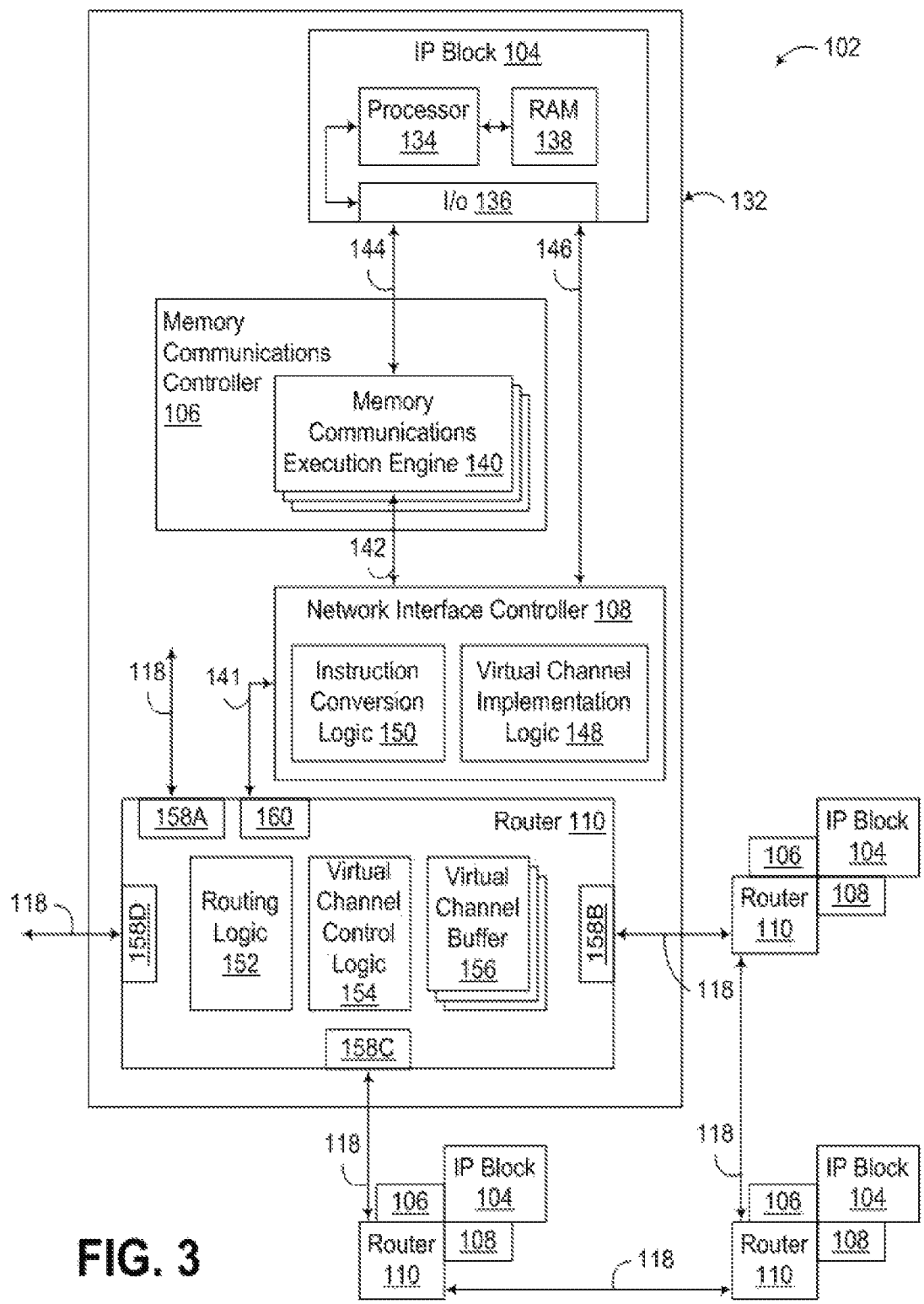
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
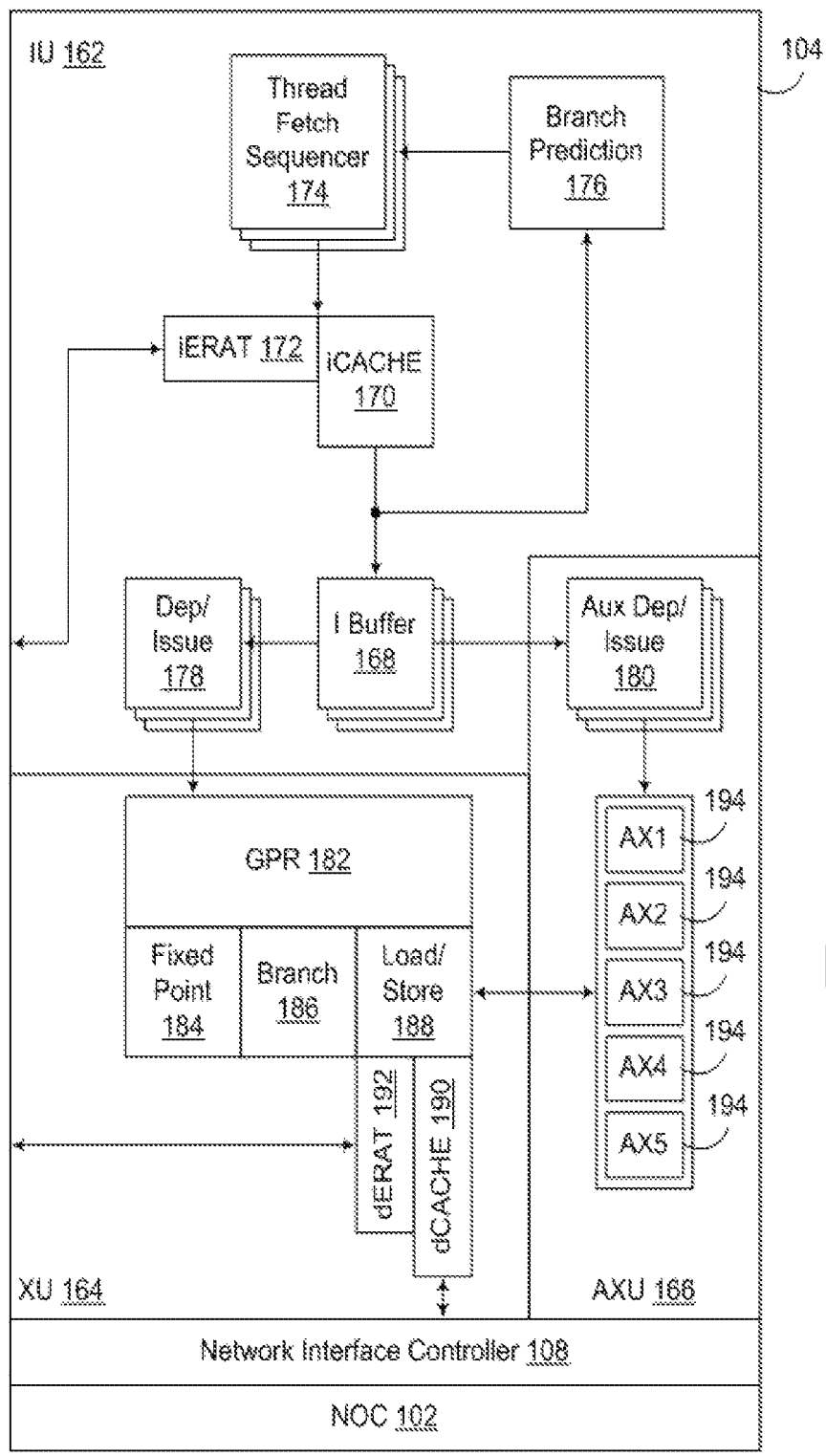
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multi-threaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Dynamic Thread Status Retrieval Using Inter-Thread Communication

NOC systems utilizing direct inter-thread communication (DITC) include a plurality of interconnected IP blocks configured within a plurality of hardware threads. In embodiments of the invention, an inbox/outbox model is used, whereby transmitting data packets is may be referred to as "message passing," and a message (i.e., a data packet) is transmitted from an output buffer (i.e., an "outbox") of a first hardware thread to an input buffer (i.e., an "inbox") of a second hardware thread over the network of the NOC. As such, each hardware thread of a DITC implementation includes an inbox and an outbox, and messages passed over the network of the NOC include an address corresponding to the respective destination hardware thread (or pool of hardware threads) to which the message is to be passed.

Embodiments of the invention perform status retrieval/collection for one or more hardware threads by communicating status requests and responses as DITC messages. Particularly, a particular hardware thread may process a software thread that causes the particular hardware thread to perform as a master hardware thread for one or more slave hardware threads and/or hardware resources connected to the network of the NOC. Consistent with embodiments of the invention, the master hardware thread may communicate a status request to one or more slave hardware threads, receive responses from the slave hardware threads and perform one or more operations in response. For example, the master hardware thread may store status information for one or more slave hardware threads to a memory location, such as an external memory location and/or a local buffer. As further examples, the master hardware thread may communicate a status notification to executing software; the master hardware thread may communicate a message responsive to a status response that interrupts software execution; the master hardware thread may filter and/or ignore status responses of particular type(s) while performing operation(s) responsive to receiving other type(s) of responses.

Each slave hardware thread may be configured with status logic configured to automatically determine a status of the slave hardware thread and communicate a status response DITC message over the network of the NOC responsive to receiving a status request from the master thread at the inbox of the slave hardware thread. Consistent with embodiments of the invention, the status logic is configured to perform such operations independent of the operation of the slave hardware thread. Therefore, the status of the slave hardware thread may be determined and communicated without interrupting processing of the slave hardware thread, which may provide performance and efficiency benefits as compared to interrupting processing at the slave hardware thread to process the status request at the slave hardware thread. Moreover, the status of the slave hardware thread may be determined and communicated without initializing operation of the slave hardware thread if the slave hardware thread is in a low-power idle operation mode and/or powered down, which may provide efficiency benefits as compared to waking/powering up the slave hardware thread to process the status request at the slave hardware thread.

Figure 5:
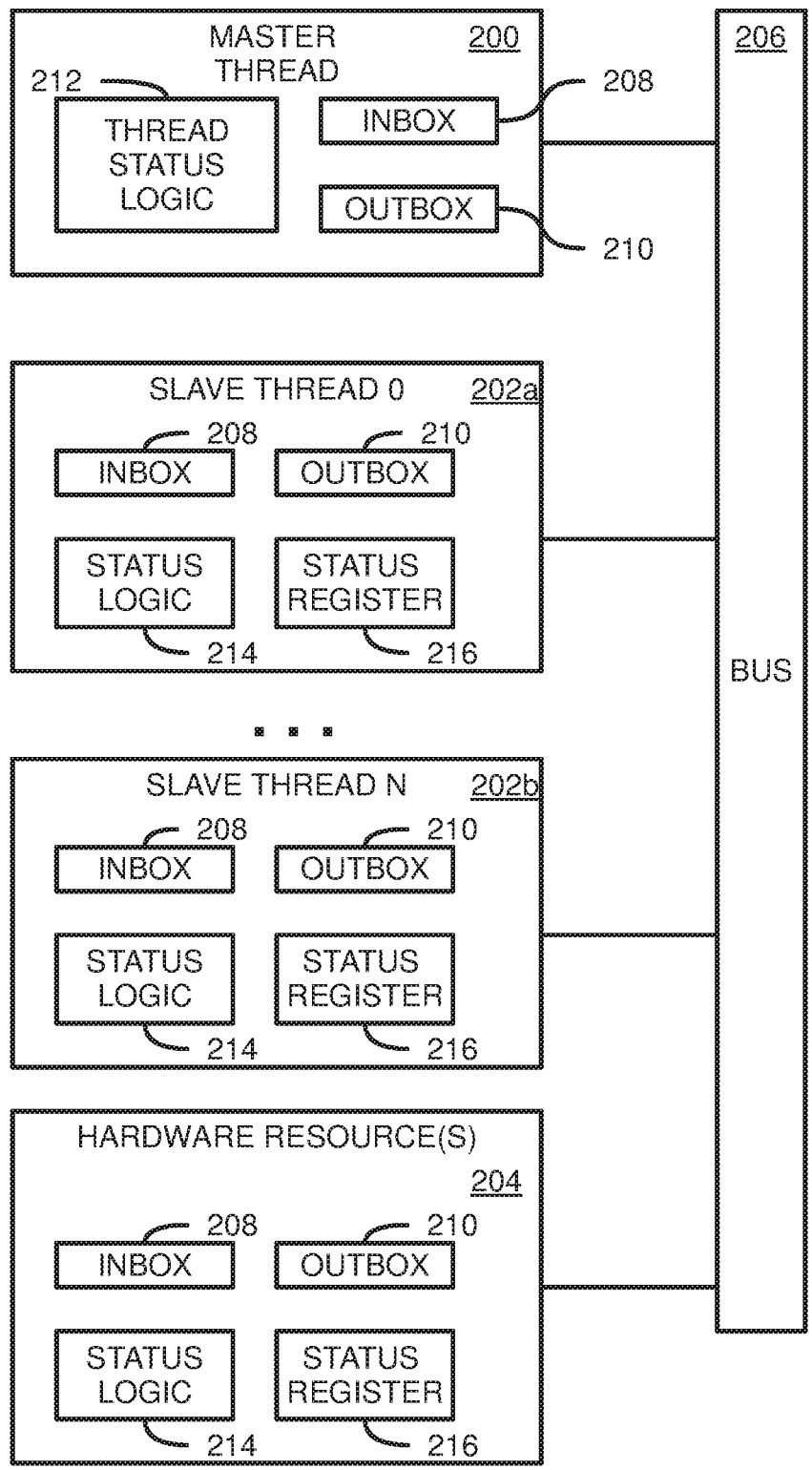
FIG. 5 is a block diagram illustrating a master hardware thread, a plurality of interconnected slave hardware threads, and one or more connected hardware resources that may be configured in the NOC of FIG. 2, and for which status related data may be dynamically collected consistent with embodiments of the invention.

Turning now to FIG. 5, this figure provides a block diagram illustrating a master hardware thread 200 (also referred to herein as master thread), connected slave hardware threads 202a,b (also referred to herein as slave threads), and one or more connected hardware resources 204 in communication over a communication bus 206 that status information may be dynamically retrieved/collected from by the master thread 200. Consistent with DITC messaging, the master thread 200, slave threads 202a,b, and the one or more hardware resources 204 each include a DITC inbox 208 and outbox 210. Each inbox 208 is configured to receive DITC messages directed to the associated hardware thread 200, 202a,b, and/or hardware resources 204 from the communication bus 206, and each outbox is configured to send DITC messages over the communication bus 206.

The master thread 200 includes thread status logic 212 that is configured to communicate a status request to one or more of the slave threads 202a,b and/or one or more hardware resources 204. In some embodiments, the thread status logic 212 may selectively communicate status requests to particular slave threads 202a, b and/or hardware resources 204, or the thread status logic 212 may communicate status requests to all associated slave threads 202a,b and/or hardware resources 204. The thread status logic 212 is further configured to process status responses received at the inbox 208 of the master thread 200. In general, the thread status logic 212 may be configured to store status information in a memory based on received status responses, communicate a notification based on received status responses, interrupt software execution based on received status responses, collect and filter status responses to perform the operations responsive to particular types of status responses, and/or other such operations.

Each slave thread 202a,b and any hardware resources 204 associated with the master thread 200 may be configured with status logic 214 and a status register 216. The status logic 214 may monitor the inbox 208 to detect receipt of a status request from the master thread 200. In response to receiving a status response, the status logic 214 may determine a status associated with the corresponding slave thread 202a,b or hardware resource 204 and the status logic 214 may communicate a status response as a DITC message based on the determined status. The status logic 214 may determine the status of the corresponding slave thread 202a,b and/or hardware resource 204 by accessing the status register 216, where the status register may store status information for the corresponding slave thread 202a,b and/ or hardware resource 204. The status register 216 may be a special purpose register configured to store status information and/or any type of memory designated to store status information. The status register 216 may store counter information and/or other such relevant information corresponding to the corresponding slave thread 202a,b or hardware resource 204 that indicates performance of the corresponding slave thread 202a,b or hardware resource 204.

Figure 6:
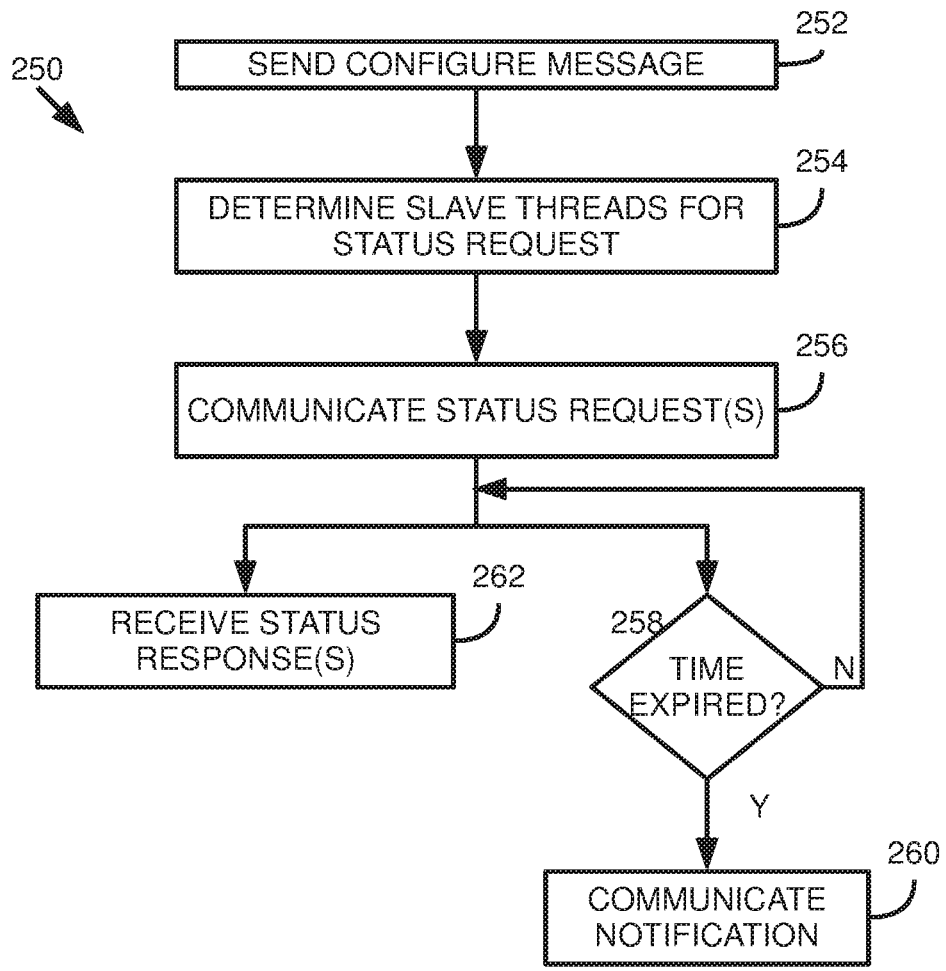
FIG. 6 is a flowchart illustrating a sequence of operations that may be performed by the master hardware thread of FIG. 5 to communicate one or more status requests to the interconnected slave hardware threads and/or the one or more hardware resources of FIG. 5.

Turning now to FIG. 6, this figure provides a flowchart 250 that illustrates a sequence of operations that may be performed by a master hardware thread consistent with embodiments of the invention to dynamically retrieve/collect status information for one or more associated slave hardware threads and/or hardware resources. As discussed, the master thread may retrieve status information for associated slave hardware threads as well as configured hardware resources, hence, where the remaining examples and description refer to slave hardware threads, it should be understood that hardware resources consistent with embodiments of the invention may be considered interchangeable with the slave hardware threads. The master hardware thread may communicate a configuration message to all hardware threads desired to be managed by the master thread (block 252). In general, the configuration message configures all the slave threads for status retrieval by the master thread. For example, based on the configuration message, a status register may be configured to store status information in a particular format (e.g., store a performance counter), and status logic may be configured to communicate a status response including specified status information in a particular format.

The master thread may determine slave threads from which status information is to be retrieved/collected (block 254). In general, the master thread may communicate status request to one or more targeted slave threads or a status request may be communicated to all associated slave threads. The master thread is configured to process a software thread that causes the master thread to perform operations associated with the master thread as described herein. Hence, the master thread may target particular slave threads for status retrieval and/or retrieve a status from all associated hardware threads based on the software thread that is processed by the master thread. The master thread communicates a status request as a DITC message to the one or more determined slave threads (block 256). The master thread may be configured monitor status response time from slave threads (block 258), and if a status response is not received within a defined amount of time ("Y" branch of block 258), the master thread may communicate a notification (block 260). In general, the master thread may communicate a notification such that an executing software and/or operating system generating a workload for the hardware threads may be notified that a slave thread is non-responsive. The master thread may receive status responses as DITC messages for the communicated status requests (block 262).

Figure 7:
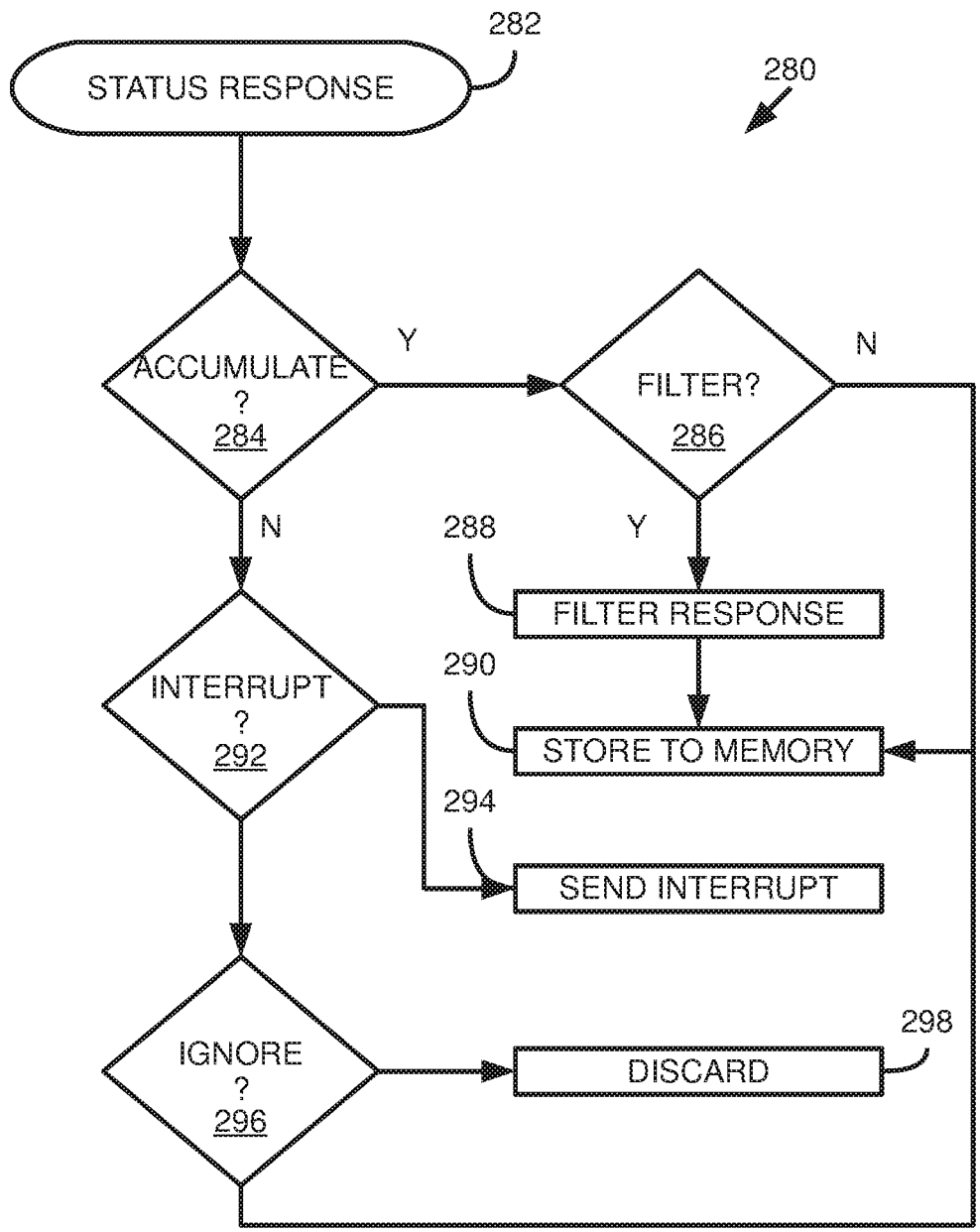
FIG. 7 is a flowchart illustrating a sequence of operations that may be performed by the master hardware thread of FIG. 5 to process received status responses.

FIG. 7 provides a flowchart 280 that illustrates a sequence of operations that may be performed by a master thread in response to receiving a status response from a slave thread (block 282). In some embodiments of the invention, the master thread may be configured to accumulate status responses (i.e., store, collect, and/or aggregate) (block 284). In addition, if the master thread is configured to accumulate status responses ("Y" branch of block 284), the master thread may be configured to filter the status responses such that only particular types of responses are stored (block 286). If the master thread is configured to filter received status responses ("Y" branch of block 286), the master thread may filter the received status responses (block 288) using masks and comparison logic configured in thread status logic to determine whether a received status response is of a type that may be stored to memory (block 290). If the master thread is not configured to filter status responses ("N" branch of block 286), the master thread may store received status responses to memory (block 290). For example, the master thread may be configured to filter status responses that indicate that a slave thread is operating normally, and the master thread may be configured to store status responses that indicate that a slave thread is not operating normally.

Returning to block 284, if the master thread is not configured to accumulate status responses ("N" branch of block 284), the master thread may be configured to interrupt software execution based on whether a received status response is of a particular type (block 292). If the master thread is configured to interrupt software execution based on a status response and a received status response is of a type for which the master thread is configured to interrupt software execution for ("Y" branch of block 292), the master thread may communicate an interrupt message (e.g., command/notification) (block 294). Sending the interrupt message may comprise communicating a DITC message to one or more connected hardware threads (which may be more threads that those configured as slave threads), and/or sending the interrupt message may comprise communicating data to a memory location that may be monitored for interrupt commands/notifications.

If the master thread is not configured to interrupt software execution based on receiving a status response of a particular type and/or if the master thread does not receive a status response of the particular type ("N" branch of block 292), the master thread may be configured to ignore particular types of status responses (block 296). If the master thread is configured to ignore particular types of status responses and the master thread receives a status response of the particular type ("Y" branch of block 296), the master thread may discard the status response (block 298). If the status response is not of the particular type ("N" branch of block 296), the master thread may store the status response to memory (block 290). Hence, the master thread may be configured to ignore particular types of status responses and store only particular types. For example, if a first status response indicates that a particular slave thread is processing and assigned tasks of the workload, and a second status response received at a later time indicates the same status for the particular slave thread, the master thread may discard the second status response as the status has not changed. However, if the second status response indicates that the particular hardware thread has completed processing tasks, the master thread may store the status of the status message to memory, as the second status response indicated that the status changed for the particular hardware thread.

Figure 8:
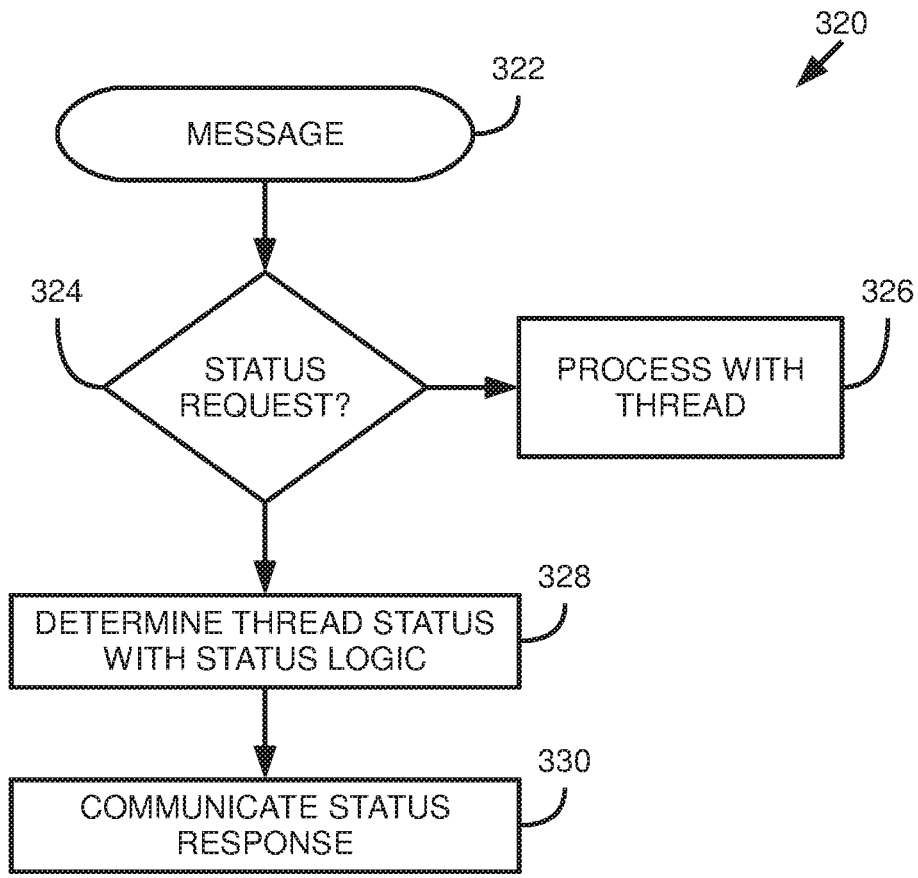
FIG. 8 is a flowchart illustrating a sequence of operations that may be performed by a slave hardware thread and/or hardware resources of FIG. 5 responsive to receiving a status request.

FIG. 8 provides a flowchart 320 that illustrates a sequence of operations that may be performed by a slave thread and/or hardware resource consistent with embodiments of the invention in response to receiving a message (block 322) at an associated inbox. In general, the status logic of a slave thread monitors the associated inbox to detect the receipt of status requests (block 324). If a message is not a status request ("N" branch of block 324), the slave thread processes the message according to the software thread processing thereon (block 326). If the message is a status request ("Y" branch of block 324), the status logic of the slave thread determines a status associated with the slave thread (block 328), and the status logic communicates a status response based on the determined status to the master thread (block 330). In general, consistent with embodiments of the invention, the status logic may automatically determine the status and communicate the status response independent of the operation of the slave hardware thread. For example, a status response may be received at a slave hardware thread, and the status logic may determine the status and communicate the status response concurrent with the slave hardware thread processing a software thread, i.e., processing of the software thread is not interrupted to respond to the status request. Thus, in many embodiments, the hardware thread is never interrupted, and the associated software thread executing on that hardware thread is never notified of either the receipt of a status request or the subsequent communication of a status response.

Moreover, the status of the slave hardware thread may be based at least in part on a software thread that the slave hardware thread is processing, including for example processing performance of the one or more software threads being processed by the slave hardware thread. Hence, consistent with embodiments of the invention that distribute a workload to one or more hardware threads, the master thread may dynamically retrieve/collect status information related to the processing of the workload, i.e., the status of each software thread executing on the associated slave hardware threads.

Consistent with some embodiments of the invention, the master thread and slave threads may utilize the DITC protocol to send messages (i.e., status requests and responses). However, other messaging protocols (e.g., indirect inter-thread communications) and/or memory transactions may be used for communicating the status requests and responses. In some embodiments of the invention, messages may be broadcast to all slave threads, or some subset of slave threads utilizing a thread mask. A master thread may send a broadcast a configuration message to configure all the slave threads for the desired status. This configuration may be encoded as a hardware managed performance counter configuration that would alleviate the need to involve software on the slave thread. In addition, the configuration message may interrupt the slave thread and instruct the slave thread how to configure hardware of the slave thread (e.g., status logic and/or status register), and/or the configuration message may specify what status variables related to the hardware thread and/or the software thread processing thereon are desired to be reported/collected through the use of a status register and status logic.

Moreover, the master thread may initiate a status request that may be sent to all slave threads, or a subset of slave threads. When the status request is received it may be examined by the status logic of each slave thread. When possible, the status logic may automatically generate a status response and send it to the master thread. A status response may include data from a status register (e.g., a performance counter, a dedicated special purpose register, and/or or any other state that may be preconfigured as status information). In some embodiments, in the case of complex status requests, processing of the software thread may be interrupted so that the software layer may generate the status response.

In some embodiments, the hardware of the master thread (e.g., the thread status logic) may receive all status responses and may perform several different actions. For example, the thread status logic of the master thread may be configured to accumulate counts; ignore some responses; interrupt software for some responses; accumulate filtered responses into a locally accessible hardware buffer; or store responses out to a memory location. In addition, complex masks may be configured to control and filter what responses are stored. The hardware including the thread status logic may be configured with a status response time such that the master thread may collect status responses for a predetermined period before notifying software. Such configuration may be implemented to handle the case where a slave thread is asleep and not responding. In some embodiments, the thread status logic may simply require that all slave threads respond and use a simple counter to determine that all slave threads have responded. In addition, hardware resources may be configured with status logic consistent with embodiments of the invention such that the status of such hardware resources may be determined as described herein. For example, a master thread may query the status of connected non-processor hardware resources.

While the invention has been illustrated by a description of the various embodiments and the examples, and while these embodiments have been described in considerable detail, it is not the intention of the applicants to restrict or in any other way limit the scope of the appended claims to such detail. For example, the blocks of any of the flowcharts may be re-ordered, processed serially and/or processed concurrently without departing from the scope of the invention. Moreover, any of the flowcharts may include more or fewer blocks than those illustrated consistent with embodiments of the invention.

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A method for retrieving a status for a slave hardware thread in a processing system comprising a plurality of hardware threads configured in a plurality of interconnected integrated processor blocks, the method comprising:
   receiving a status request for the slave hardware thread from a master hardware thread at an inbox;
   in response to receiving the status request at the inbox, determining a status of the slave hardware thread using status logic and a status register associated with the slave hardware thread, wherein the status logic is configured to determine the status of the slave hardware thread without interrupting processing of the slave hardware thread; and
   communicating a status response based on the status to the master hardware thread,
   wherein the status register is configured to store status information for the slave hardware thread, wherein determining the status of the slave hardware thread comprises analyzing the status register by the status logic to determine the status slave hardware thread, and wherein the status information includes a performance counter for the slave hardware thread.

2. The method of claim 1, further comprising:
   receiving a configuration message at the slave hardware thread from the master hardware thread; and
   processing the configuration message at the slave hardware thread to configure the status logic of the slave hardware thread to automatically communicate a status response responsive to receiving a status request to the master hardware thread.

3. The method of claim 1, further comprising determining the status of the slave hardware thread and communicating the status response are performed concurrent with processing a software thread with the slave hardware thread.

4. The method of claim 1, further comprising:
   receiving the status response at the master hardware thread; and
   storing status information for the slave hardware thread to memory based at least in part on the received status response.

5. The method of claim 4, further comprising prior to storing the status information for the slave hardware thread to memory, determining whether the status response is of a particular type by filtering the status response with a mask using thread status logic associated with the master hardware thread, wherein the status information is stored to memory responsive to determining that the status response is of the particular type.

6. The method of claim 1, further comprising:
   receiving the status response at the master hardware thread; and
   determining whether the status response is of a particular type.

7. The method of claim 6, further comprising in response to determining that the status response is of the particular type, communicating an interrupt message to the slave hardware thread.

8. The method of claim 6, wherein determining whether the status response is of a particular type comprises filtering the status response with thread status logic of the master hardware thread by with a mask.

9. The method of claim 1, further comprising:
   communicating the status request from the master hardware thread;
   monitoring the receipt of the status response at the master hardware thread to determine whether the status response was received within a predefined amount of time from communicating the status request.

10. The method of claim 9, further comprising communicating a notification from the master hardware thread responsive to not receiving the status response within the predefined amount of time.

11. The method of claim 1, wherein the plurality of hardware threads are connected to a network with a direct inter-thread communication interface.

* * * * *